(12) United States Patent
Hasegawa (10) Patent No.: US 11,459,474 B2
(45) Date of Patent: Oct. 4, 2022

(54) WHITE INK, STORING CONTAINER, INKJET PRINTER, INKJET PRINTING METHOD, AND PRINTED MATTER

(71) Applicant: RICOH COMPANY, LTD., Tokyo (JP)

(72) Inventor: Ken Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 708 days.

(21) Appl. No.: 16/355,751

(22) Filed: Mar. 17, 2019

(65) Prior Publication Data

US 2019/0284413 A1 Sep. 19, 2019

(30) Foreign Application Priority Data

Mar. 19, 2018 (JP) .............................. JP2018-050615

(51) Int. Cl.
*C09D 11/322* (2014.01)
*C09D 11/328* (2014.01)

(52) U.S. Cl.
CPC .......... *C09D 11/322* (2013.01); *C09D 11/328* (2013.01)

(58) Field of Classification Search
CPC ...... C09D 11/32; C09D 11/322; C08F 265/04
See application file for complete search history.

(56) References Cited

U.S. PATENT DOCUMENTS

| | | | | |
|---|---|---|---|---|
| 2004/0034147 A1* | 2/2004 | Zama | ..................... | C08F 265/04 524/460 |
| 2006/0275606 A1* | 12/2006 | Mizutani | .............. | C09D 11/322 428/404 |
| 2010/0227129 A1* | 9/2010 | Sano | ......................... | D06P 7/00 427/288 |
| 2013/0222503 A1* | 8/2013 | Okuda | ................. | C09D 11/107 106/31.89 |
| 2013/0225748 A1* | 8/2013 | Jakubek | ............... | C09D 11/322 524/556 |
| 2015/0252204 A1 | 9/2015 | Hasegawa | | |
| 2016/0152845 A1* | 6/2016 | Okada | .................... | C09D 11/32 347/86 |
| 2016/0177116 A1 | 6/2016 | Katsuragi et al. | | |

FOREIGN PATENT DOCUMENTS

| | | | | |
|---|---|---|---|---|
| JP | 2000-239585 A | * | 9/2000 | ............... B41J 2/01 |
| JP | 2006-274214 | | 10/2006 | |
| JP | 2006-3071 98 | | 11/2006 | |
| JP | 2007-2111 76 | | 8/2007 | |

(Continued)

OTHER PUBLICATIONS

Japanese Office Action dated Sep. 21, 2021 in Japanese Application No. 2018050615, with English translation, 6 pages.

*Primary Examiner* — Khanh T Nguyen (74) *Attorney, Agent, or Firm* — Grüneberg and Myers PLLC (57) ABSTRACT

A white ink is provided. The white ink comprises water and hollow particles having a volume average particle diameter of from 300 to 800 nm. Each of the hollow particles comprises a hollow resin particle and an inorganic layer covering a surface of the hollow resin particle. The hollow resin particle has a resin layer having an average thickness of from 25 to 100 nm. The inorganic layer has an average thickness of from 5 to 20 nm.

18 Claims, 1 Drawing Sheet

(56) References Cited

FOREIGN PATENT DOCUMENTS

| | | |
|---|---|---|
| JP | 2010-031196 | 2/2010 |
| JP | 2010-037137 | 2/2010 |
| JP | 2011-046861 | 3/2011 |
| JP | 2012041380 | 3/2012 |
| JP | 2016-169284 | 9/2016 |
| JP | 2017-061664 | 3/2017 |
| JP | 2017141441 | 8/2017 |
| WO | WO2010/074063 A1 | 7/2010 |

* cited by examiner

WHITE INK, STORING CONTAINER, INKJET PRINTER, INKJET PRINTING METHOD, AND PRINTED MATTER

CROSS-REFERENCE TO RELATED APPLICATIONS

This patent application is based on and claims priority pursuant to 35 U.S.C. § 119(a) to Japanese Patent Application No. 2018-050615, filed on Mar. 19, 2018, in the Japan Patent Office, the entire disclosure of which is incorporated by reference herein.

BACKGROUND

Technical Field

Embodiments of this disclosure relate to a white ink, a storing container, an inkjet printer, an inkjet printing method, and a printed matter.

Description of the Related Art

In inkjet printing systems, metal oxides, barium sulfate, and calcium carbonate have been used as white pigments. These white pigments have a high hiding power and robustness, but may settle over time due to their high specific gravity. In accordance with the Stokes' law, the larger the volume average particle diameter is and the lower the viscosity of the dispersion solvent is, the faster the sedimentation rate becomes.

In a dispersion solvent having a low viscosity suitable for an inkjet printing system, the white pigments settle at a volume average particle diameter exhibiting a high hiding power. Therefore, commercially available inkjet recording devices have a circulation mechanism or have the user shake the cartridge, in order to prevent sedimentation of the white pigments.

SUMMARY

An embodiment of the present invention provides a white ink. The white ink comprises water and hollow particles having a volume average particle diameter of from 300 to 800 nm. Each of the hollow particles comprises a hollow resin particle and an inorganic layer covering a surface of the hollow resin particle. The hollow resin particle has a resin layer having an average thickness of from 25 to 100 nm. The inorganic layer has an average thickness of from 5 to 20 nm.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present invention provide a white ink having excellent dispersion stability, hiding power, and heat resistance.

(White Ink)

The white ink of the present disclosure comprises water and hollow particles. The hollow particles have a volume average particle diameter of from 300 to 800 nm. Each of the hollow particles comprises a hollow resin particle and an inorganic layer covering a surface of the hollow resin particle. The hollow resin particle has a resin layer having an average thickness of from 25 to 100 nm, and the inorganic layer has an average thickness of from 5 to 20 nm. The white ink may further comprise other components in accordance with need.

The white ink of the present disclosure is achieved based on the knowledge that, in conventional inkjet printing, when printing an ink on an impermeable medium such as a polyethylene terephthalate (PET) sheet or an acrylic sheet, the ink is not expected to dry by permeation, and most of the drying is due to evaporative drying, thus, a method of heating is utilized as a means for promoting evaporation, and thus, regarding a white ink which comprises hollow resin particles, the hollow resin particles are deformed by heating and the hiding power is impaired.

With regards to this point, if a styrene resin having a high refractive index is used for the hollow resin particles for the white ink, a high whiteness can be obtained, but because the styrene resin has a low glass transition point (Tg), the hollow particles are destroyed due to the heating. On the one hand, an acrylic resin has the characteristic that the refractive index is low but the glass transition point (Tg) is high.

Therefore, in the present disclosure, both a high whiteness and heat resistance is achieved by using specific hollow particles as a white color material, which have a volume average particle diameter of from 300 to 800 nm and comprise hollow resin particles (preferably comprising a styrene-acrylic resin) covered with an inorganic material.

<Hollow Particles>

Each of the hollow particles is an organic-inorganic composite hollow particle obtained by covering the surface of a hollow resin particle with an inorganic layer.

The volume average particle diameter of the hollow particles is from 300 to 800 nm, and is preferably from 400 to 600 nm. The hiding power and the dispersion stability become good in the range of 300 nm to 800 nm. If the volume average particle diameter is less than 300 nm, the hiding power may decrease, and if the volume average particle diameter is in excess of 800 nm, the dispersion stability may deteriorate.

The volume average particle diameter of the hollow particles can be measured using, for example, a particle analyzer (NanotracWave-EX150, manufactured by Nikkiso Co., Ltd).

The average thickness of the resin layer of the hollow resin particle is from 25 to 100 nm, preferably from 50 to 80 nm. The hiding power and the dispersion stability become good when the average thickness of the resin layer is in a range of from 25 to 100 nm. If the average thickness of the resin layer is less than 25 nm, the hiding power may decrease, and if the average thickness of the resin layer is in excess of 100 nm, the dispersion stability may deteriorate.

The average thickness of the inorganic layer is from 5 to 20 nm, and preferably from 10 to 15 nm.

The average thickness of the resin layer and the average thickness of the inorganic layer can be determined by, for example, observing the hollow resin particles with a transmission electron microscope (JEM-2100, manufactured by JEOL Ltd.), randomly selecting 100 particles, measuring the thickness of the resin layer and the thickness of the inorganic layer, and calculating the average thickness of the resin layer and the average thickness of the inorganic layer.

The hollow resin particles are preferably comprised of a styrene-acrylic resin, for obtaining both a high whiteness and heat resistance.

The acrylic ratio in the styrene-acrylic resin is preferably from 5% to 30%, and more preferably from 10% to 20%. When the acrylic ratio is from 5% to 30%, both the hiding power and the heat resistance can be ensured. If the acrylic ratio is in excess of 30%, the heat resistance improves, but the hiding power may decrease, and if the acrylic ratio is less than 5%, the hiding power is high at room temperature, but the hollow resin particles may be destroyed when heated, thus, the hiding power may decrease.

The acrylic ratio in the styrene-acrylic resin is measured by, for example, a Fourier transform infrared spectrophotometer (FT/IR-6800, manufactured by JASCO Corporation), and the acrylic ratio can be determined from the absorbance ratio between the absorbance at 1730 $cm^{-1}$ derived from the carbonyl expansion motion of acrylic acid and the absorbance at 1600 $cm^{-1}$ due to the C═C stretching vibration of the aromatic ring of polystyrene.

The inorganic material in the inorganic layer is not particularly limited. It can suitably be selected to a particular application. Examples thereof include, but are not limited to, titanium oxide, zinc oxide, aluminum oxide, and silica. Among these inorganic materials, titanium oxide and silica are preferable for the heat resistance and the whiteness.

The content of the hollow particles is not particularly limited. It can suitably be selected to a particular application, and is preferably from 5% by mass to 20% by mass relative to the total amount of the white ink.

<Preparation Method of Hollow Particles>

The hollow particles can be prepared by, for example, covering the surface of hollow resin particles prepared by an emulsion polymerization method with an inorganic compound.

The inorganic compound is not particularly limited. It can suitably be selected to a particular application. Examples thereof include, but are not limited to, titanium tetraisopropoxide, tetraethoxysilane, and zinc chloride.

The emulsion polymerization method is not particularly limited. It can suitably be selected to a particular application. Examples thereof include, but are not limited to, a method of forming an emulsion of hollow resin particles by heating and stirring a vinyl monomer, a surfactant, a polymerization initiator, and an aqueous dispersion medium in a nitrogen atmosphere.

Specific examples of the vinyl monomer include, but are not limited to, a nonionic monoethylenic unsaturated monomer and a difunctional vinyl monomer.

Specific examples of the nonionic monoethylenic unsaturated monomer include, but are not limited to, styrene, vinyl toluene, ethylene, vinyl acetate, vinyl chloride, vinylidene chloride, acrylonitrile, (meth)acrylamide, and (meth)acrylate. These nonionic monoethylenic unsaturated monomers may be used singly or two or more can be used in combination. Among these nonionic monoethylenic unsaturated monomers, styrene and (meth)acrylate are preferable.

Specific examples of the (meth)acrylate include, but are not limited to, methyl (meth)acrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, and stearyl (meth)acrylate. These (meth)acrylates may be used singly or two or more can be used in combination.

Specific examples of the difunctional vinyl monomer include, but are not limited to, divinyl benzene, allyl methacrylate, ethylene glycol dimethacrylate, 1,3-butanediol dimethacrylate, diethylene glycol dimethacrylate, and trimethylolpropane trimethacrylate. These difunctional vinyl monomers may be used singly or two or more can be used in combination.

Note that, a hollow resin particle having properties such as heat resistance, solvent resistance, and dispersibility in solvents can be obtained by highly crosslinking by copolymerizing a monofunctional vinyl monomer with a difunctional vinyl monomer.

<Water>

The water is not particularly limited. It can suitably be selected to a particular application. Examples thereof include, but are not limited to, pure water such as ion-exchange water, ultrafiltration water, reverse osmosis water, and distilled water, and ultrapure water. These may be used singly or two or more can be used in combination.

The content of the water is preferably from 15% by mass to 60% by mass, and more preferably from 20% by mass to 40% by mass, relative to the total amount of white ink. When the content is 15% by mass or more, the ink is prevented from becoming highly viscous, and the discharge stability can improve. When the content is 60% by mass or less, the wettability to a non-permeable recording medium is suitable, and the image quality can improve.

The white ink of the present disclosure may further include an organic solvent, a resin, and/or an additive in accordance with need.

<Organic Solvent>

The organic solvent in the present disclosure is not specifically limited, and a water soluble organic solvent can be used. Examples thereof include, but are not limited to, polyvalent alcohols, ethers such as polyvalent alcohol alkyl ethers and polyvalent alcohol aryl ethers, nitrogen-containing heterocyclic compounds, amides, amines, and sulfur-containing compounds.

Specific examples of the water soluble organic solvent include, but are not limited to, polyvalent alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether, ethylene glycol, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethylpropionamide, and 3-butoxy-N,N-dimethylpropionamide; amines such as monoethanolamine, diethanolamine, triethanolamine, and triethyl amine; sulfur-containing compounds such as dimethyl sulfoxide, sulfolane, and thiodiethanol; propylene carbonate; and ethylene carbonate.

The water soluble organic solvent not only functions as a wetting agent, but also can obtain a good drying property, thus, an organic solvent having a boiling point of 250° C. or less is preferably used.

Polyol compounds having eight or more carbon atoms and glycol ether compounds are also suitably used. Specific examples of the polyol compounds having eight or more carbon atoms include, but are not limited to, 2-ethyl-1,3-hexanediol and 2,2,4-trimethyl-1,3-pentanediol.

Specific examples of the glycol ether compounds include, but are not limited to, polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; and polyvalent alcohol aryl ethers such as ethylene glycol monophenyl ether and ethylene glycol monobenzyl ether.

The content of the organic solvent in the ink is not particularly limited. It can suitably be selected to a particular application, but is preferably from 10% by mass to 60% by mass, and more preferably from 20% by mass to 60% by mass, for the drying property of the ink and the discharge stability.

<Resin>

The resin comprised in the ink is not particularly limited. It can suitably be selected to a particular application. Examples thereof include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Particles of these resins may be also used. It is possible to mix a resin emulsion in which the resin particles are dispersed in water as a dispersion medium with materials such as a coloring material and an organic solvent to obtain the ink. Any suitably synthesized resin particle may be used, and a commercially available product may be used. Further, the resin particle may be used singly, or two or more resin particles may be used in combination.

The volume average particle diameter of the resin particles is not particularly limited. It can suitably be selected to a particular application, but for obtaining a good fixability and a high image hardness, is preferably from 10 to 1,000 nm, more preferably from 10 to 200 nm, and furthermore preferably from 10 to 100 nm.

The volume average particle diameter can be measured using, for example, a particle analyzer (Nanotrac Wave-UT151, manufactured by MicrotracBEL Corp).

The content of the resin is not particularly limited. It can suitably be selected to a particular application, but for the fixability and the preservation stability of the ink, is preferably from 1% by mass to 30% by mass, and more preferably from 5% by mass to 20% by mass, relative to the total amount of the ink.

The particle diameter of the solid contents in the ink is not specifically limited, and can be appropriately selected in accordance with the purpose, but for increasing the discharge stability and image quality such as the image density, the maximum frequency in terms of maximum number conversion is preferably from 20 to 1,000 nm, and more preferably from 20 to 150 nm. The solid contents include resin particles, particles of pigments, and the like. The particle diameter can be measured using a particle analyzer (Nanotrac Wave-UT151, manufactured by MicrotracBEL Corp).

<Additives>

Surfactants, defoaming agents, preservatives and fungicides, corrosion inhibitors, pH adjusters, and the like may be added to the ink in accordance with need.

<Surfactant>

Any of silicone-based surfactants, fluorine-based surfactants, amphoteric surfactants, non-ionic surfactants, and anionic surfactants may be used as the surfactant.

The silicone-based surfactant is not specifically limited and can be appropriately selected in accordance with the purpose. Among the silicon-based surfactants, those which do not decompose at a high pH are preferable, and specific examples of such silicone-based surfactants include, but are not limited to, side-chain-modified polydimethylsiloxane, both-end-modified polydimethylsiloxane, one-end-modified polydimethylsiloxane, and side-chain-both-end-modified polydimethylsiloxane. Silicone-based surfactants having a polyoxyethylene group or a polyoxyethylene polyoxypropylene group as a modifying group are particularly preferable since such silicone-based surfactants show good properties as an aqueous surfactant. Further, examples of the silicone-based surfactant include a polyether-modified silicone-based surfactant, and specific examples thereof include a compound in which a polyalkylene oxide structure is introduced into the side chain of the Si site of dimethyl siloxane.

Specific preferred examples of the fluorine-based surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluorine-based surfactants are particularly preferable as the foaming property is low. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Specific examples of counter ions of salts in these fluorine-based surfactants include, but are not limited to, Li, Na, K, $NH_4$, $NH_3CH_2CH_2OH$, $NH_2(CH_2CH_2OH)_2$, $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the non-ionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These surfactants may be used singly or in combinations of two or more.

The silicone-based surfactant is not particularly limited. It can suitably be selected to a particular application. Examples thereof include, but are not limited to, side-chain-modified polydimethyl siloxane, both-end-modified polydimethylsiloxane, one-end-modified polydimethylsiloxane, and side-chain-both-end-modified polydimethylsiloxane. Polyether-modified silicone-based surfactant having a polyoxyethylene group or a polyoxyethylene polyoxypropylene group as the modifying group is particularly preferable because it demonstrates good characteristics as an aqueous surfactant.

Any suitably synthesized surfactant may be used, and a commercially available product may be used. Commercially available products may be obtained from BYK Japan KK, Shin-Etsu Chemical Co., Ltd., Dow Corning Toray Co., Ltd., Nihon Emulsion Co., Ltd, Kyoeisha Chemical Co., Ltd., and the like.

The aforementioned polyether-modified silicone-based surfactant is not specifically limited, may be appropriately selected in accordance with the purpose. Specific examples of the polyether-modified silicone-based surfactant include, a compound in which a polyalkylene oxide structure represented by General Formula (S-1) is introduced into the side chain of the Si site of dimethyl polysiloxane.

General formula (S-1)

$X = ——R(C_2H_4O)_a(C_3H_6O)_bR'$

In General formula (S-1), m, n, a, and b each independently represent integers, R represents an alkylene group, and R' represents an alkyl group.

Commercial products of the aforementioned polyether-modified silicone-based surfactant can be used. Specific examples thereof include, but are not limited to: KF-618, KF-642, and KF-643 (available from Shin-Etsu Chemical Co., Ltd.); EMALEX-SS-5602 and SS-1906EX (available from Nihon Emulsion Co., Ltd); FZ-2105, FZ-2118, FZ-2154, FZ-2161, FZ-2162, FZ-2163, and FZ-2164 (available from Dow Corning Toray Co., Ltd.); BYK-33 and BYK-387 (available from BYK Japan KK); and TSF4440, TSF4452, and TSF4453 (available from Toshiba Silicones Co., Ltd.).

The fluorine-based surfactant is preferably a compound in which the number of fluorine-substituted carbon atoms is from 2 to 16, and more preferably a compound in which the number of fluorine-substituted carbon atoms is from 4 to 16.

Specific examples of the fluorine-based surfactant include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Among these fluorine-based surfactants, polyoxyalkylene ether polymer compounds having a perfluoroalkyl ether group in its side chain are preferable because they do not foam easily, and fluorine-based surfactants represented by General formula (F-1) or General formula (F-2) are specifically preferable.

$$CF_3CF_2(CF_2CF_2)_m—CH_2CH_2O(CH_2CH_2O)_n H \quad \text{General formula (F-1)}$$

In the compound represented by the aforementioned General formula (F-1), in order to impart water solubility, m is preferably an integer from 0 to 10, and n is preferably an integer from 0 to 40.

$$CnF_{2n+1}—CH_2CH(OH)CH_2—O—(CH_2CH_2O)_a—Y \quad \text{General formula (F-2):}$$

In the compound represented by the aforementioned General formula (F-2), Y represents H, $CmF_{2m+1}$ where m is an integer from 1 to 6, $CH_2CH(OH)CH_2—CmF_{2m+1}$ where m is an integer from 4 to 6, or $CpH_{2p+1}$ where p is an integer from 1 to 19; n is an integer from 1 to 6; and a is an integer from 4 to 14.

A commercially available product may be used as the aforementioned fluorine-based surfactant. Specific examples of the commercially available product include, but are not limited to, SURFLON S-111, S-112, S-113, S-121, S-131, S-132, S-141, and S-145 (all manufactured by Asahi Glass Co., Ltd.); FLUORAD FC-93, FC-95, FC-98, FC-129, FC-135, FC-170C, FC-430, and FC-431 (all manufactured by Sumitomo 3M); MEGAFACE F-470, F-1405, and F-474 (all manufactured by DIC Corporation); Zonyl TBS, FSP, FSA, FSN-100, FSN, FSO-100, FSO, FS-300, and UR, CAPSTONE FS-30, FS-31, FS-3100, FS-34, and FS-35 (all manufactured by The Chemours Company); FT-110, FT-250, FT-251, FT-400S, FT-150, and FT-400SW (all manufactured by Neos Co., Ltd.); POLYFOX PF-136A, PF-156A, PF-151N, PF-154, and PF-159 (manufactured by Omnova Solutions Inc.), and Unidyne DSN-403N (manufactured by Daikin Industries). Among these commercially available products, FS-3100, FS-34 and FS-300 manufactured by The Chemours Company, FT-110, FT-250, FT-251, FT-400S, FT-150, and FT-400SW manufactured by Neos Co., Ltd., POLYFOX PF-151N manufactured by Omnova Solutions Inc., and UNIDYNE DSN-403N manufactured by Daikin Industries are particularly preferable for good printing quality, and in particular, coloring, and the improvement on permeation, wettability, and uniform dying property to the paper.

The content of the surfactant in the ink is not particularly limited. It can suitably be selected to a particular application, but for excellent wettability and discharging stability and the improvement of the image quality, is preferably from 0.001% by mass to 5% by mass, and more preferably from 0.05% by mass to 5% by mass.

<Defoaming Agent>

The defoaming agent is not specifically limited, and specific examples of the defoaming agent include, but are not limited to, silicon-based defoaming agents, polyether-based defoaming agents, and aliphatic acid ester-based defoaming agents. These defoaming agents may be used singly or two or more can be used in combination. Among these defoaming agents, silicone-based defoaming agents are preferable for an excellent foam braking effect.

<Preservatives and Fungicides>

The preservatives and fungicides are not specifically limited, and examples of the preservatives and fungicides include, but are not limited to, 1,2-benzisothiazoline-3-on.

<Corrosion Inhibitor>

The corrosion inhibitor is not specifically limited, and specific examples of the corrosion inhibitor include, but are not limited to, acid sulfite and sodium thiosulfate.

<pH Adjuster>

The pH adjuster is not specifically limited as long as it is capable of adjusting the pH to 7 or more, and examples thereof include, but are not limited to, amines such as diethanolamine and triethanolamine.

The properties of the ink are not particularly limited. It can suitably be selected to a particular application. The viscosity, the surface tension, and the pH are preferably in the following ranges.

The viscosity of the ink at 25° C. is preferably from 5 to 30 mPa·s, and more preferably from 5 to 25 mPa·s, for the improvement of the print density and text quality, and, obtaining a good dischargeability. Here, the viscosity can be measured by, for example, a rotatory viscometer (RE-80L, manufactured by Toku Sangyo Co., Ltd.). The measurements were performed for 3 minutes at 25° C., using a standard cone rotor (1°34'×R24), with a sample liquid amount of 1.2 mL, at a number of rotations of 50 rpm.

The surface tension of the ink is preferably 35 mN/m or less and more preferably 32 mN/m or less at 25° C. so that the ink is suitably levelized on the recording medium and the drying time of the ink is shortened.

The pH of the ink is preferably from 7 to 12 and more preferably from 8 to 11 for preventing corrosion of the metal members in contact with the ink.

The ink can be suitably used for inkjet printing.

(Preparation Method of Ink)

The ink can be prepared by, for example, stirring and mixing the water, the organic solvent, the polysiloxane surfactant, the polyurethane resin particle, and the other components in accordance with need.

The stirring and mixing may be performed by, for example, a sand mill, a homogenizer, a ball mill, a paint shaker, an ultrasonic disperser, a stirrer using a typical stirring blade, a magnetic stirrer, or a high-speed disperser.

(Storing Container)

The storing container includes a container and any of the white ink or a non-white ink stored therein.

The storing container may include other members which are appropriately selected according to the specific need.

The container is not specifically limited, and the shape, structure, size, material, etc., can be appropriately selected in accordance with need. Specific examples of the container include, but are not limited to, a container having at least an ink bag formed by an aluminum laminate film or a resin film.

<Pre-Processing Fluid>

The pre-processing fluid contains a flocculant, an organic solvent, and water, and may contain a surfactant, a defoaming agent, a pH adjuster, preservatives and fungicides, a corrosion inhibitor, and the like in accordance with need.

The organic solvent, the surfactant, the defoaming agent, the pH adjuster, the preservatives and fungicides, and the corrosion inhibitor can use the same materials as the material used in the ink, and, other materials used in known processing fluids can be used.

The type of flocculant is not specifically limited, and water-soluble cationic polymers, acids, multi-valent metal salts and the like may be included.

<Post-Processing Fluid>

The post-processing fluid is not specifically limited as long as it is possible to form a transparent layer. The post-processing fluid can be obtained by selecting and mixing organic solvents, water, resins, surfactants, defoaming agents, pH adjusters, preservatives and fungicides, corrosion inhibitors, and the like in accordance with need. Further, the post-processing fluid may be coated on the entire region of the recording region formed on the recording medium, or may be coated on only the region on which formed the ink image.

(Recording Medium)

The recording medium is not specifically limited, and plain paper, gloss paper, special paper, cloth and the like can be used. A good image formation is also possible on a non-permeable substrate.

The non-permeable substrate is a substrate having a surface with low water permeability and absorbency. Examples thereof also include materials having numerous voids inside but unopened to the outside. More quantitatively, the non-permeable substrates refer to a substrate that results in a water absorption amount, measured by a Bristow method, of 10 mL/m$^2$ or less when 30 msec$^{1/2}$ has passed from a start of contact.

Examples of the non-permeable substrate preferably include plastic films such as polyvinyl chloride resin films, polyethylene terephthalate (PET) films, polypropylene, polyethylene, and polycarbonate films.

(Recording Device and Recording Method)

The ink of the present disclosure can be suitably used in various recording devices employing an inkjet printing system such as printers, facsimile machines, photocopiers, printer/facsimile machine/photocopier multifunction peripherals, and stereoscopic modeling devices.

In the present disclosure, the recording device is a device capable of discharging ink and various processing fluids onto a recording medium, and the recording method is a method for recording using the device. The recording medium means an article to which the ink or the various processing fluids can be attached at least temporarily.

The recording device includes not only a head portion for discharging ink, but also a device relating to feeding, conveying, and ejecting the recording medium, and other devices referred to as pre-processing devices, and post-processing devices.

The recording device may also include a heater and a drier for use in the heating process and the drying process, respectively, in the recording method. For example, the heating device and the drying device heat and dry the top surface and the bottom surface of a print medium having an image. The heating device and the drying device are not particularly limited. For example, a fan heater and an infra-red heater can be used. The heating and the drying can be performed before, during, or after the printing.

Further, the recording device and the recording method are not limited to those merely producing meaningful visible images such as texts and figures with the ink. For example, the printing device and the printing method can produce patterns like geometric design and 3D images.

Further, the recording device is not particularly limited, and includes both a serial type device in which the discharging head is caused to move, and a line type device in which the discharging head is not moved.

Furthermore, the recording device is not only a desktop type, but also includes a wide type recording device capable of printing on an A0 size recording medium, for example, a continuous printer capable of using continuous paper wound up in a roll form as the recording medium.

Figure 1:
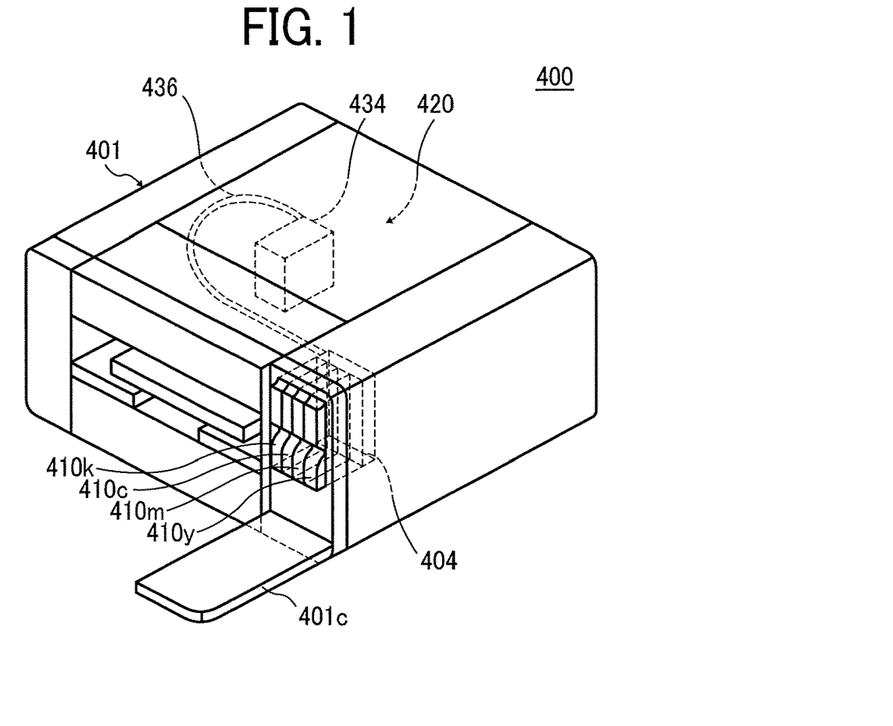
FIG. 1 is a perspective view illustrating an inkjet printer according to an embodiment of the present invention.
Figure 2:
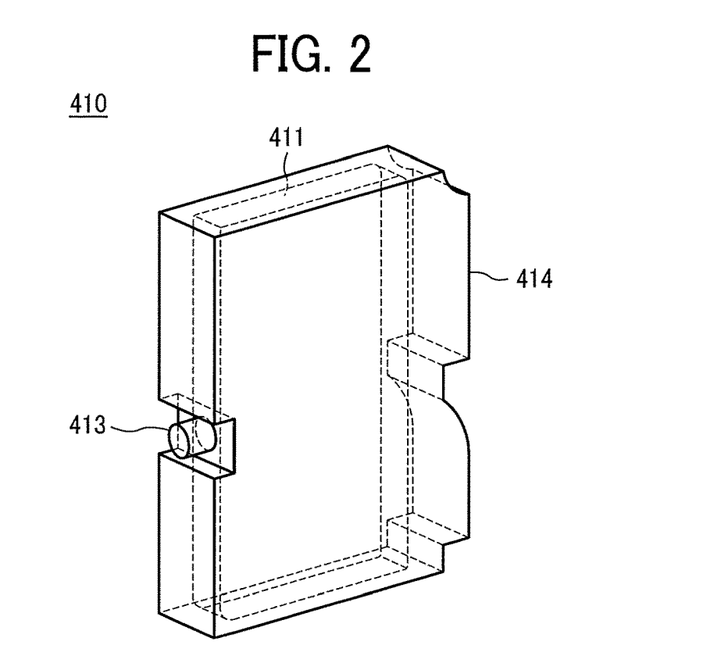
FIG. 2 is a perspective view illustrating a main tank in the inkjet printer according to an embodiment of the present invention.

An example of the recording device is described with reference to FIG. 1 and FIG. 2. FIG. 1 is a perspective view of the same device. FIG. 2 is a perspective view of the main tank. An image forming apparatus 400 which is an example of the recording device is a serial type image forming device. A mechanical unit 420 is disposed on an exterior 401 of the image forming apparatus 400. Each ink container 411 of each main tank 410 (i.e., 410k, 410c, 410m, and 410y) for each color, black (K), cyan (C), magenta (M), and yellow (Y) is formed by a packing member such as an aluminum laminate film. The ink container 411 is stored in, for example, a plastic storing container case 414. Therefore, the main tank 410 is used as an ink cartridge for each color.

On the one hand, a cartridge holder 404 is disposed on the rear side of the opening when a cover 401c of the device main body is opened. The main tank 410 is detachably attached to the cartridge holder 404. As a result, each ink discharging outlet 413 of the main tank 410 communicates with a discharging head 434 for each color via a supplying tube 436 for each color, so that the ink can be discharged from the discharging head 434 to the recording medium.

This recording device can include not only an ink discharging unit, but also devices referred to as a pre-processing device and a post-processing device.

As a preferred example of the pre-processing device and the post-processing device, there is the embodiment which adds a liquid container containing a pre-processing fluid or a post-processing fluid to a liquid discharging head in the same manner the case of the inks such as black (K), cyan (C), magenta (M), and yellow (Y), and discharges the pre-processing fluid or the post-processing fluid by an inkjet printing system.

As another example of the pre-processing device and the post-processing device, there is an embodiment which provides a pre-processing device and a post-processing device by a blade coating method, a roll coating method, or a spray coating method other than an inkjet printing system.

Note that, the application method of the ink is not limited to an inkjet recording method, and it is possible to use in a wide variety of methods. Specific examples of application methods of the ink of the present disclosure other than the inkjet recording method include, but are not limited to, a blade coating method, a gravure coating method, a bar coating method, a roll coating method, a dip coating method, a curtain coating method, a slide coating method, a die coating method, and a spray coating method.

The application of the ink of the present disclosure is not particularly limited. It can suitably be selected to a particular application. For example, the ink can be used for printed matter, a paint, a coating material, and a foundation. Furthermore, the ink can be used not only to form two-dimensional texts and images, but can also be used to form three-dimensional solid object (stereoscopic modeled object) as a material for 3D modeling.

The stereoscopic modeling device for fabricating a stereoscopic modeled object is not specifically limited and any known device can be used, and specific examples thereof include a device including an ink container, a supplying device, a discharging device, and a drier. The stereoscopic modeled object includes those obtained by repeatedly coating ink. Further, a molded processed product obtained by processing the structure imparting the ink on a substrate such as a recording medium is included. The molded processed product is fabricated by, for example, subjecting a printed matter or a structure body formed to a sheet-shape or a film-shape to a molding process such as heating drawing or punching. The molded processed product can be suitably used in use applications in which molding is necessary after decorating the surface, for example, meters and operation panels of automobiles, office automation equipment, electric or electronic devices, and cameras.

EXAMPLES

The specific examples of the present disclosure are described below, but the present disclosure is not limited to these examples.

Preparation Example 1

—Preparation of Hollow Particle 1—

12.0 g of acrylic acid and 228.0 g of styrene were mixed with 0.9 g of thioglycolic acid as a chain transfer agent to prepare a monomer mixture. Further, separately, 3.6 g of potassium persulfate was dissolved in 100 g of water to prepare a polymerization initiator aqueous solution.

Next, 460 g of water and 7 g of sodium dodecylbenzenesulfonate were placed in a 1 L four mouth flask equipped with a stirrer and a thermometer and heated to 85° C. while stirring.

The monomer mixture and the polymerization initiator aqueous solution were continuously injected separately into the aforementioned flask, while holding the temperature at 90° C. during this time to progress a polymerization, and after completion of the injection, subjected to an aging for 30 minutes.

Next, after heating to 95° C. to complete the polymerization and thereafter cooling to room temperature, the reaction product was washed and filtered to obtain hollow styrene-acrylic resin particles.

After 20 g of the obtained hollow styrene-acrylic resin particles were dispersed in 500 g of ion-exchange water, 87 g of ammonia solution (manufactured by Wako Pure Chemical Corporation, 25% by mass aqueous solution) and 32 g of tetraethoxysilane (manufactured by Wako Pure Chemical Corporation, Special Grade Reagent, 95% by mass) were added thereto and stirred for 24 hours, to obtain a coating of a silica shell. Then, the preparation was washed and filtered to prepare a hollow particle 1.

Preparation Example 2

—Preparation of Hollow Particle 2—

A hollow particle 2 was prepared in the same manner as Preparation example 1 with the exception that 72 g of acrylic acid and 168 g of styrene were mixed with 0.9 g of thioglycolic acid as a chain transfer agent to prepare the monomer mixture in Preparation example 1.

Preparation Example 3

—Preparation of Hollow Particle 3—

Hollow styrene-acrylic resin particles were prepared in the same manner as Preparation example 1 with the exception that 24 g of acrylic acid and 216 g of styrene were mixed with 0.9 g of thioglycolic acid as a chain transfer agent to prepare the monomer mixture in Preparation example 1.

20 g of the obtained hollow styrene-acrylic resin particles were added to a mixture of 13 g of isopropyl alcohol and 1 g of titanium tetraisopropoxide (manufactured by Wako Pure Chemical Corporation, Wako First Grade) and stirred, 0.2 g of ion-exchange water was added gradually thereto, and the titanium tetraisopropoxide was hydrolyzed to obtain a titanium coating. Next, after drying under reduced pressure at 100° C., the preparation was washed and filtered to prepare a hollow particle 3.

Preparation Example 4

—Preparation of Hollow Particle 4—

Hollow styrene-acrylic resin particles were prepared in the same manner as Preparation example 1 with the exception that 72 g of acrylic acid and 168 g of styrene were mixed with 0.9 g of thioglycolic acid as a chain transfer agent to prepare the monomer mixture in Preparation example 1.

20 g of the obtained hollow styrene-acrylic resin particles were added to a zinc chloride aqueous solution (manufactured by Tokyo Chemical Industry Co., Ltd.), and after adding an ammonia solution (manufactured by Wako Pure Chemical Corporation, 25% by mass aqueous solution) until the initially formed precipitates dissolved, the preparation was heated at 80° C. for 2 hours to obtain a zinc oxide coating.

Next, the preparation was washed and filtered to prepare a hollow particle 4.

Preparation Example 5

—Preparation of Hollow Particle 5—

A hollow particle 5 was prepared in the same manner as Preparation example 1 with the exception that 7.2 g of acrylic acid and 232.8 of styrene g were mixed with 0.9 g of thioglycolic acid as a chain transfer agent to prepare the monomer mixture in Preparation example 1.

Preparation Example 6

—Preparation of Hollow Particle 6—

A hollow particle 6 was prepared in the same manner as Preparation example 1 with the exception that 96 g of acrylic acid and 144 g of styrene were mixed with 0.9 g of thioglycolic acid as a chain transfer agent to prepare the monomer mixture in Preparation example 1.

Preparation Example 7

—Preparation of Hollow Particle 7—

A hollow particle 7 was prepared in the same manner as Preparation example 1 with the exception that 72 g of acrylic acid and 168 g of styrene were mixed with 0.9 g of thioglycolic acid as a chain transfer agent to prepare the monomer mixture in Preparation example 1.

Preparation Example 8

—Preparation of Hollow Particle 8—

A hollow particle 8 was prepared in the same manner as Preparation example 1 with the exception that 72 g of acrylic acid and 168 g of styrene were mixed with 0.9 g of thioglycolic acid as a chain transfer agent to prepare the monomer mixture in Preparation example 1.

Preparation Example 9

—Preparation of Hollow Particle 9—

Hollow styrene-acrylic resin particles were prepared in the same manner as Preparation example 3 with the exception that 96 g of acrylic acid and 144 g of styrene were mixed with 0.9 g of thioglycolic acid as a chain transfer agent to prepare the monomer mixture in Preparation example 1.

20 g of the obtained hollow styrene-acrylic resin particles were added to a mixture of 13 g of isopropyl alcohol and 1 g of titanium tetraisopropoxide (manufactured by Wako Pure Chemical Corporation, Wako First Grade) and stirred, 0.2 g of ion-exchange water was added gradually thereto, and the titanium tetraisopropoxide was hydrolyzed to obtain a titanium coating. Next, after drying under reduced pressure at 100° C., the preparation was washed and filtered to prepare a hollow particle 9.

Preparation Example 10

—Preparation of Hollow Particle 10—

Hollow styrene-acrylic resin particles were prepared in the same manner as Preparation example 4 with the exception that 72 g of acrylic acid and 168 g of styrene were mixed with 0.9 g of thioglycolic acid as a chain transfer agent to prepare the monomer mixture in Preparation example 1.

After 5 g of the obtained hollow styrene-acrylic resin particles were added to a zinc chloride aqueous solution (manufactured by Tokyo Chemical Industry Co., Ltd.), and after adding an ammonia solution (manufactured by Wako Pure Chemical Corporation, 25% by mass aqueous solution) until the initially formed precipitates dissolved, the preparation was heated at 80° C. for 2 hours to obtain a zinc oxide coating.

Next, the preparation was washed and filtered to prepare a hollow particle 10.

Preparation Example 11

—Preparation of Hollow Particle 11—

Hollow styrene-acrylic resin particles were prepared in the same manner as Preparation example 1 with the exception that 26.4 g of acrylic acid and 213.6 g of styrene were mixed with 0.9 g of thioglycolic acid as a chain transfer agent to prepare the monomer mixture in Preparation example 1, and then, a hollow particle 11 was obtained without covering of the inorganic layer.

Preparation Example 12

—Preparation of Hollow Particle 12—

Hollow styrene-acrylic resin particles were prepared in the same manner as Preparation example 1 with the exception that 72 g of acrylic acid and 168 g of styrene were mixed with 0.9 g of thioglycolic acid as a chain transfer agent to prepare the monomer mixture in Preparation example 1.

After 20 g of the obtained hollow styrene-acrylic resin particles were dispersed in 500 g of ion-exchange water, 87 g of ammonia solution (manufactured by Wako Pure Chemical Corporation, 25% by mass aqueous solution) and 192 g of tetraethoxysilane (manufactured by Wako Pure Chemical Corporation, Special Grade Reagent, 95% by mass) were added, and mixed for 24 hours to obtain a coating of a silica shell. Then, the preparation was washed and filtered to prepare a hollow particle 12.

Next, the acrylic ratio, the average thickness of the resin layer, and the average thickness of the inorganic layer were measured for each of the obtained hollow particles as follows. The results are shown in Table 1 and Table 2.

<Acrylic Ratio Measurement>

Each of the hollow particles was measured by a Fourier transform infrared spectrophotometer (FT/IR-6800, manufactured by JASCO Corporation), and the acrylic ratio (%) was determined from the absorbance ratio between the absorbance at 1730 cm$^{-1}$ derived from the carbonyl expansion motion of acrylic acid and the absorbance at 1600 cm$^{-1}$ due to the C=C stretching vibration of the aromatic ring of polystyrene.

<Measurement of Thickness of Resin Layer and Thickness of Inorganic Layer>

Each of the hollow particles were observed by a transmission electron microscope (JEM-2100, manufactured by JEOL Ltd.), 100 particles were randomly selected, the thickness of the resin layer and the thickness of the inorganic layer was measured, and the average thickness of the resin layer and the average thickness of the inorganic layer were calculated.

<Preparation of Hollow Particle Dispersion Liquid>

After 30 g of each of the hollow particles 1 to 12, 3 g of Rheodol TW-O120V (manufactured by Kao Corporation), and 67 g of pure water were added in a beaker, and thoroughly stirred with a stirrer, a treatment was performed by an ultrasonic homogenizer US-300T manufactured by Nissei Corporation (tip diameter 26 mm) at 200 µA for one hour while cooling to perform a dispersion treatment, and thereby obtain the hollow particle dispersion liquids 1 to 12 (solid concentration of 30% by mass).

The volume average particle diameter of the obtained hollow particle dispersion liquid was measured using a particle analyzer (NanotracWave-EX150, manufactured by Nikkiso Co., Ltd). The results are shown in Table 1 and Table 2.

Next, characteristics were evaluated for each of the obtained white inks as follows. The results are shown in Table 3 and Table 4.

<Hiding Power>

An ink cartridge filled with each of the white inks was installed in an inkjet printer (manufactured by Ricoh Company Ltd., RICOH Pro L4160), and a white solid image was prepared on a transparent PET sheet (LLPET1223, manufactured by Sakurai Co., Ltd.) of non-porous substrate at an ink adhesion amount of 0.6 g/cm$^2$.

The white solid images were dried on hot plates (NI-NOSND-1, manufactured by As One Corporation) set to 25° C. and 80° C.

The PET sheet on which the white solid image was formed was superimposed on black paper to evaluate the extent to which the black color would disappear as the hiding power. Specifically, the image density of the solid part was measured by a spectroscopic colorimeter densitometer (939, manufactured by X-Rite, Inc.) in a state in which the PET sheet after image formation was superimposed on the black paper (Product name: Color Paper Intermediate Paper (Black), basis weight: 80 g/m$^2$, manufactured by Nagatoya-Shouten Co., Ltd), and the contrast ratio was calculated based on the following Numerical formula 1 to evaluate the hiding power. Note that, the higher the contrast ratio, the more excellent the hiding power, thus, the contrast ratio of less than 60% is deemed to be out of the practical application range.

Contrast ratio (%)=[1−(density of white solid image/density of black paper (1.35))]×100    Numerical formula 1

<Sedimentation Rate (Dispersion Stability)>

10 g of each of the white inks was placed in a flat-bottom test tube (manufactured by EKO Instruments) having an inner diameter of 15 mm and a height of 120 mm, and the

TABLE 1

|  | Hollow particle 1 | Hollow particle 2 | Hollow particle 3 | Hollow particle 4 | Hollow particle 5 | Hollow particle 6 |
| --- | --- | --- | --- | --- | --- | --- |
| Acrylic ratio (%) | 5 | 30 | 10 | 30 | 3 | 40 |
| Average thickness of resin layer (nm) | 25 | 100 | 50 | 50 | 50 | 50 |
| Material of inorganic layer | Silica | Silica | Titanium oxide | zinc oxide | Silica | Silica |
| Average thickness of inorganic layer (nm) | 5 | 20 | 10 | 10 | 10 | 10 |
| Volume average particle diameter of dispersion liquid (nm) | 300 | 800 | 400 | 400 | 400 | 400 |

TABLE 2

|  | Hollow particle 7 | Hollow particle 8 | Hollow particle 9 | Hollow particle 10 | Hollow particle 11 | Hollow particle 12 |
| --- | --- | --- | --- | --- | --- | --- |
| Acrylic ratio (%) | 30 | 30 | 40 | 30 | 11 | 30 |
| Average thickness of resin layer (nm) | 50 | 50 | 10 | 30 | 30 | 150 |
| Material of inorganic layer | Silica | Silica | Titanium oxide | zinc oxide | — | Silica |
| Average thickness of inorganic layer (nm) | 10 | 10 | 3 | 25 | — | 30 |
| Volume average particle diameter of dispersion liquid (nm) | 200 | 1000 | 300 | 300 | 300 | 300 |

Examples 1 to 6 and Comparative Examples 1 to 6

—Preparation of Inks—

As shown in Table 3 and Table 4, white inks of Examples 1 to 6 and Comparative examples 1 to 6 were prepared by stirring and mixing each of the hollow particle dispersion liquid and each component.

top was sealed with a silicone cap. The flat-bottom test tube was set in a Turbiscan (Solution Stability Evaluation Device, Device name: MA2000, manufactured by EKO Instruments), and the scattered light intensity in the 45° direction was measured when a near-infrared light of a wavelength of 850 nm was emitted at an incident angle of 0° from the horizontal direction of the flat-bottom test tube.

The intensity of the scattered light is represented by scattered light intensity/incident light intensity×100(%). The measurement was performed 500 times from the liquid surface of the sample to 20 mm below the liquid surface at 0.04 mm intervals, and the average value was calculated as the MV value. When sedimentation of the white color material (hollow particles) occurred, the scattered light intensity became weak, thus, the MV value became smaller.

The MV value for the white inks at 23° C. was measured in the initial state and in the state after standing for 100 hours from the initial state, the values respectively obtained thereby were denoted as $MV_0$ (initial state) and $MV_{100}$ (after standing for 100 hours), the sedimentation rate was calculated by the following Numerical formula 2, and the dispersion stability was evaluated over time. The lower the sedimentation rate, the more excellent the dispersion stability. Note that, the initial state refers to the state immediately after the white ink was thoroughly shaken by hand. Further, when the sedimentation rate is 0.05 or less, the dispersion stability is good.

$$\text{Sedimentation rate (\%)} = (MV_0 - MV_{100})/MV_0 \quad \text{Numerical formula 2}$$

<Heat Resistance>

The heat resistance is represented by Numerical formula 3 based on the contrast ratio at the drying temperature 80° C. relative to the contrast ratio at the drying temperature of 25° C. A heat resistance of 50% or less is deemed to be out of the practical application range.

$$\text{Heat resistance (\%)} = \text{contrast ratio (25° C.)/contrast ratio (80° C.)} \times 100 \quad \text{Numerical formula 3}$$

TABLE 3

|  |  | Example 1 | Example 2 | Example 3 | Example 4 | Example 5 | Example 6 |
|---|---|---|---|---|---|---|---|
| Hollow particle dispersion liquid | Hollow particle dispersion liquid 1 | 30 | — | — | — | — | — |
|  | Hollow particle dispersion liquid 2 | — | 30 | — | — | — | — |
|  | Hollow particle dispersion liquid 3 | — | — | 30 | — | — | — |
|  | Hollow particle dispersion liquid 4 | — | — | — | 30 | — | — |
|  | Hollow particle dispersion liquid 5 | — | — | — | — | 25 | — |
|  | Hollow particle dispersion liquid 6 | — | — | — | — | — | 30 |
|  | Hollow particle dispersion liquid 7 | — | — | — | — | — | — |
|  | Hollow particle dispersion liquid 8 | — | — | — | — | — | — |
|  | Hollow particle dispersion liquid 9 | — | — | — | — | — | — |
|  | Hollow particle dispersion liquid 10 | — | — | — | — | — | — |
|  | Hollow particle dispersion liquid 11 | — | — | — | — | — | — |
|  | Hollow particle dispersion liquid 12 | — | — | — | — | — | — |
| Water soluble organic solvent | 1,2-propanediol | 22 | 22 | 20 | 20 | 22 | 22 |
|  | 3-ethyl-3-hydroxymethyloxetane | 17 | 17 | 20 | — | 17 | 17 |
|  | Propylene glycol monoethyl ether | — | — | — | 20 | — | — |
| Resin | Polyester based urethane resin | 20 | 20 | 20 | 20 | 20 | 20 |
| Surfactant | KF-351A | 1 | 1 | 1 | 1 | 1 | 1 |
| Defoaming agent | 2,4,7,9-tetramethyldecane-4,7-diol | 0.5 | 0.5 | 0.5 | 0.5 | 0.5 | 0.5 |
| Preservative | Proxel LV | 0.1 | 0.1 | 0.1 | 0.1 | 0.1 | 0.1 |
| Water | Ion exchange water | Remainder | Remainder | Remainder | Remainder | Remainder | Remainder |
|  | Total (& by mass) | 100 | 100 | 100 | 100 | 100 | 100 |
|  | Contrast ratio (%) (25° C.) | 86 | 66 | 78 | 67 | 87 | 66 |
|  | Contrast ratio (%) (80° C.) | 74 | 63 | 72 | 61 | 76 | 60 |
|  | Sedimentation rate (%) | 0.02 | 0.04 | 0.04 | 0.04 | 0.03 | 0.03 |
|  | Heat resistance (%) | 86 | 95 | 92 | 91 | 87 | 91 |

TABLE 4

|  |  | Comparative example 1 | Comparative example 2 | Comparative example 3 | Comparative example 4 | Comparative example 5 | Comparative example 6 |
|---|---|---|---|---|---|---|---|
| Hollow particle dispersion liquid | Hollow particle dispersion liquid 1 | — | — | — | — | — | — |
|  | Hollow particle dispersion liquid 2 | — | — | — | — | — | — |
|  | Hollow particle dispersion liquid 3 | — | — | — | — | — | — |
|  | Hollow particle dispersion liquid 4 | — | — | — | — | — | — |
|  | Hollow particle dispersion liquid 5 | — | — | — | — | — | — |
|  | Hollow particle dispersion liquid 6 | — | — | — | — | — | — |
|  | Hollow particle dispersion liquid 7 | 30 | — | — | — | — | — |
|  | Hollow particle dispersion liquid 8 | — | 30 | — | — | — | — |
|  | Hollow particle dispersion liquid 9 | — | — | 30 | — | — | — |
|  | Hollow particle dispersion liquid 10 | — | — | — | 30 | — | — |
|  | Hollow particle dispersion liquid 11 | — | — | — | — | 30 | — |
|  | Hollow particle dispersion liquid 12 | — | — | — | — | — | 30 |
| Water soluble organic solvent | 1,2-propanediol | 22 | 22 | 20 | 20 | 20 | 20 |
|  | 3-ethyl-3-hydroxymethyloxetane | 17 | 17 | 20 | 20 | 20 | 20 |
|  | Propylene glycol monoethyl ether | — | — | — | — | — | — |
| Resin | Polyester based urethane resin | 20 | 20 | 20 | 20 | 20 | 20 |
| Surfactant | KF-351A | 1 | 1 | 1 | 1 | 1 | 1 |
| Defoaming agent | 2,4,7,9-tetramethyldecane-4,7-diol | 0.5 | 0.5 | 0.5 | 0.5 | 0.5 | 0.5 |

TABLE 4-continued

| | | Comparative example 1 | Comparative example 2 | Comparative example 3 | Comparative example 4 | Comparative example 5 | Comparative example 6 |
|---|---|---|---|---|---|---|---|
| Preservative | Proxel LV | 0.1 | 0.1 | 0.1 | 0.1 | 0.1 | 0.1 |
| Water | Ion exchange water | Remainder | Remainder | Remainder | Remainder | Remainder | Remainder |
| | Total (& by mass) | 100 | 100 | 100 | 100 | 100 | 100 |
| | Contrast ratio (%) (25° C.) | 59 | 65 | 58 | 63 | 80 | 69 |
| | Contrast ratio (%) (80° C.) | 54 | 60 | 50 | 60 | 22 | 63 |
| | Sedimentation rate (%) | 0.03 | 0.06 | 0.04 | 0.05 | 0.01 | 0.06 |
| | Heat resistance (%) | 92 | 92 | 86 | 95 | 28 | 91 |

The details of each component in Table 3 and Table 4 are as follows.
*Water soluble organic solvent: 3-ethyl-3-hydroxymethyl-oxetane (Product name: EHO, manufactured by Ube Industries, Ltd.)
*Resin: polyester based urethane resin (manufactured by Mitsui Chemicals, Inc., Product name: TAKELAC W6110)
*Surfactant: KF-351A (polyether-modified silicone-based surfactant KF-351A (manufactured by Shin-Etsu Chemical Co., Ltd.)
*Preservative: Proxel LV (manufactured by Lonza Japan)

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A white ink, comprising:
water; and
hollow particles having a volume average particle diameter of from 300 to 800 nm, each comprising:
a hollow resin particle having a resin layer having an average thickness of from 25 to 100 nm; and
an inorganic layer covering a surface of the hollow resin particle, having an average thickness of from 5 to 20 nm,
wherein the hollow resin particle comprises a styrene-acrylic resin in which an acrylic ratio is from 5% to 30%.

2. The white ink according to claim 1, wherein the inorganic layer comprises at least one of titanium oxide and silica.

3. An inkjet ink, comprising; the white ink according to claim 1.

4. A storing container, comprising:
a container; and
the white ink according to claim 1 stored in the container.

5. An inkjet printer, comprising:
the white ink according to claim 1; and
a discharger configured to discharge droplets of the white ink by an action of energy.

6. An inkjet printing method, comprising:
discharging droplets of the white ink according to claim 1 onto a recording medium by an action of energy.

7. A printed matter, comprising:
a recording medium; and
a print layer on the recording medium, comprising the white ink according to claim 1.

8. The white ink according to claim 1, wherein the hollow particles have a volume average particle diameter of from 400 to 600 nm, each comprising:
a hollow resin particle having a resin layer having an average thickness of from 50 to 80 nm; and
an inorganic layer covering a surface of the hollow resin particle, having an average thickness of from 10 to 15 nm.

9. The white ink according to claim 1, wherein the hollow resin particle comprises a styrene-acrylic resin in which the acrylic ratio is from 10% to 20%.

10. The white ink according to claim 1, wherein the inorganic layer comprises titanium oxide.

11. The white ink according to claim 1, wherein the inorganic layer comprises silica.

12. The white ink according to claim 1, wherein the inorganic layer comprises zinc oxide.

13. The white ink according to claim 1, wherein the inorganic layer comprises aluminum oxide.

14. The white ink according to claim 1, comprising 15% by mass to 60% by mass of the water relative to the total amount of the white ink.

15. The white ink according to claim 14, further comprising 20% by mass to 60% by mass of an organic solvent relative to the total amount of the white ink.

16. The white ink according to claim 1, further comprising 1 to 30% by mass of a resin relative to the total amount of the ink.

17. The white ink according to claim 16, wherein the resin comprises a polyester-based urethane resin.

18. The white ink according to claim 1, wherein the styrene-acrylic resin comprises a copolymer of acrylic acid and styrene.

* * * * *